US007272166B2

(12) United States Patent
Wang

(10) Patent No.: US 7,272,166 B2
(45) Date of Patent: Sep. 18, 2007

(54) CORRECTION METHOD FOR TIME-VARYING CHANNEL IN A TIME-SLOT DIVISION MOBILE COMMUNICATION SYSTEM

(75) Inventor: Yingmin Wang, Beijing (CN)

(73) Assignee: Da Tang Mobile Communication Equipment Co., Ltd., Beijing (CN)

( * ) Notice: Subject to any disclaimer, the term of this patent is extended or adjusted under 35 U.S.C. 154(b) by 0 days.

(21) Appl. No.: 11/165,957

(22) Filed: Jun. 24, 2005

(65) Prior Publication Data

US 2005/0276357 A1 Dec. 15, 2005

Related U.S. Application Data

(63) Continuation of application No. PCT/CN03/001132, filed on Dec. 26, 2003.

(30) Foreign Application Priority Data

Dec. 27, 2002 (CN) ................. 02 1 60500

(51) Int. Cl.
*H04B 1/707* (2006.01)
*H04B 7/212* (2006.01)
(52) U.S. Cl. ................. 375/147; 375/340; 370/347
(58) Field of Classification Search ........... 375/147, 375/148, 150, 152, 260, 340, 341, 343, 346; 370/335, 342, 337, 347
See application file for complete search history.

(56) References Cited

U.S. PATENT DOCUMENTS

| 6,002,716 | A | * | 12/1999 | Meyer et al. ............... 375/231 |
| 6,452,917 | B1 | | 9/2002 | Leung ....................... 370/342 |
| 6,504,884 | B1 | * | 1/2003 | Zvonar ...................... 375/346 |
| 6,700,919 | B1 | * | 3/2004 | Papasakellariou ........... 375/130 |

| 2003/0031238 | A1 | * | 2/2003 | Li et al. ..................... 375/147 |
| 2004/0033791 | A1 | * | 2/2004 | Schmidl et al. ............. 455/137 |

FOREIGN PATENT DOCUMENTS

CN     1353888     6/2002

(Continued)

OTHER PUBLICATIONS

International Search Report in PCT/CN03/01132 dated Apr. 1, 2004.

(Continued)

*Primary Examiner*—Young T. Tse
(74) *Attorney, Agent, or Firm*—Marshall, Gerstein & Borun LLP

(57) ABSTRACT

A correction method for time varying channels in a time slot division mobile communication system that includes: performing channel estimation and signal detection for a time-slot or burst signal received with a time invariant block processing method; estimating the channel deviation by using the detection result of some symbols that are near the channel estimation code; correcting the channel estimation with the estimated channel deviation; and demodulating the said detection result with the corrected channel estimation. The procedure can be carried out once or for a plurality of times. This correction method is adaptive to a certain degree of varying of the channel response within a time-slot while keeping the basic characteristics of the block processing method, softening the terms of application thereof in a time-slot CDMA system or similar block processing systems and improving the performance of system under the circumstances of larger frequency deviation and shift as well as higher moving speed of a terminal.

10 Claims, 2 Drawing Sheets

FOREIGN PATENT DOCUMENTS

| | | |
|---|---|---|
| JP | 2003-69530 | 3/2003 |
| WO | WO 02/096049 A1 | 11/2002 |

OTHER PUBLICATIONS

"Zero Forcing and Minimum Mean-Square-Error Equalization for Multiuser Detection in Code-Division Multiple-Access Channels", Klein et al. IEEE Transactions on Vehicular Technology, vol. 45, No. 2, 1996, pp. 276-287.

"Comparative Study of Joint-Detection Techniques for TS-CDMA Based Mobile Radio Systems", Vollmer et al. IEEE Journal On Selected Areas in Communications, vol. 19, No. 8, 2001, pp. 1461-1475.

\* cited by examiner

CORRECTION METHOD FOR TIME-VARYING CHANNEL IN A TIME-SLOT DIVISION MOBILE COMMUNICATION SYSTEM

CROSS-REFERENCE TO RELATED APPLICATION

This is a continuation of International application No. PCT/CN03/01132 filed Dec. 26, 2003, the entire disclosure of which is incorporated herein by reference.

BACKGROUND OF THE INVENTION

1. Field of the Technology

The invention relates generally to mobile communication technology, especially to a correction method for a time varying channel in a time-slot division mobile communication system. The invention provides an iterative correction method for channel estimation, applicable to a time-slotted CDMA system or other, similar block processing systems.

2. Related Technology

Complexity and time varying characters of channels are the most obvious characteristics of wireless mobile communications. In a coherent receiving system, it is necessary to estimate and measure channels at a receiving end, and then perform coherent detection with the obtained channel responses.

Channel response is determined by characteristics of a transmitting device, propagation of RF carrier in a wireless channel, and a receiving device. Doppler frequency shift caused by a moving terminal, a radio propagation channel response variations, fading variations, frequency drift, and deviation of devices etc. will lead to a time varying channel response and eventually affect performance of a system. Therefore, at the receiving end, the channel estimation and measurement must keep up with the channel variation in order to guarantee a good demodulation performance for received data.

In the time-slotted CDMA system or a similar block processing system, usually it is supposed that within a block (a time-slot or a burst signal), the channel response is time invariant. The assumption and other limitations bring great convenience to system design and relevant processing. Nevertheless, the assumption that the channel response is time invariant within a block has limited the application of the system, i.e. the application thereof has high requirements on frequency deviation and shift as well as on the moving speed of a terminal.

The burst structure in a traffic time-slot in the TD-SCDMA (3GPP 1.28 Mcps TDD) system is taken as an example for further description. As shown in FIG. 1, a midamble at the middle of a burst signal is used for channel estimation and can be called a channel estimation code while at both sides of the midamble are traffic data fields. In the TD-SCDMA system, the parameters of a traffic time-slot are as follows: the time-slot length is 675 μs; the length of a symbol is 12.5 μs when the spread factor is 16; and the length of a chip is 781 ns. Each time-slot (or a burst signal) has two traffic data fields, each of which has 22 symbols (spread factor 16). Thus each of the two traffic data fields has a total of 352 chips and a midamble of 144 (128+16) chips.

If a channel response is time invariant in a time slot, then channel response estimates for each user in this time slot can be obtained with the midamble. Carrying out joint detection (or matched filtering) and demodulation for the two traffic data fields with this fixed channel response estimation result, respectively, and data from the transmitting end can be recovered at the receiving end. This block processing mode brings convenience to system design, channel estimation and signal detection at a receiving end, making it possible for new techniques such as multi-user channel estimation and signal joint detection to be applied practically. Refer to the following relevant documents: [1] A. Klein, G. K. Kaleh and P. W. Baier, "Zero forcing and minimum mean square error equalization for multiuser detection in code division multiple access channels," IEEE Trans. Veh. Tech., vol. 45, pp. 276–287, May 1996; [2] M. Vollmer, M. Haardt, and J. Gotze, "Comparative study of joint-detection techniques for TD-CDMA based mobile radio systems," *IEEE J Select. Areas Commun.*, vol. 19, no. 8, pp. 1461–1475, August 2001.

Nevertheless, the block processing method limits the system working conditions. When the channel response varies within a time-slot, the system performance will obviously become worse. Phase variation caused by channel response variations will worsen the performance of demodulation that contains phase, modulation signals, such as phase shift keying (PSK) and quadrature amplitude modulation (QAM); and an amplitude variation caused by channel response variation will worsen the performance of demodulation that contains amplitude modulation signals, such as QAM. The main causes that lead to channel response variation are as follows: deviation between transmitting frequency and receiving frequency; Doppler frequency shift caused by a moving terminal and fast fading etc. For example, with the 2 GHz carrier frequency, the maximum Doppler frequency shift is 463 Hz when the terminal moving speed is 250 km/h, the phase varying at one of the two ends of a TD-SCDMA time-slot relative to the phase at the center of the time-slot could be up to 1.25×π/4, making it impossible to demodulate a QPSK signal. The limitation will become more strict when 8-PSK modulation or 16-QAM modulation is used.

It is seen from the foregoing example that the system performance will deteriorate in a mobile communication system based on block processing when the channel varies quickly. Therefore, when it is required that the channel response does not vary within one time-slot, application of the system will be strictly limited, and the limitation is mainly on frequency deviation and shift as well as on the moving speed of a terminal.

Therefore, in a time-slotted CDMA system or other similar block processing systems, it is very significant to improve the system performance in case of quickly varying channels. In other words, it is necessary to correct the channel response variation within a block for the block processing system. However, there are two difficulties in performing the correction.

One is complexity of the processing: if the time invariant characteristic within a block is destroyed, the processing complexity will be increased sharply, which will create practical difficulties.

The other is the difficulty in obtaining the channel response variation: if only one channel estimation is given in one time-slot, and the two neighboring time-slots of a user are not consecutive, such as the time division duplex (TDD) system in 3GPP, then it is impossible to know the channel response varying situation from channel estimation results through interpolation and prediction.

In summary, in the time slot CDMA or similar systems, when processing burst data or time-slot data as a block with the channel response being time invariant, system design as well as channel estimation and signal detection at the receiving end will become convenient because techniques, such as multi-user channel estimation and joint detection, can be practically applied. Nevertheless, in systems with this block processing method, there are more strict limitations on channel response variations caused by factors such as frequency deviation and shift as well as terminals moving at a high speed. When channel characteristics are varied within a block, the performance of a system based on block processing will deteriorate. As a result, the block processing method limits the application of the system by limiting the scope of frequency deviation and shift in the system as well as the moving speed of a terminal.

SUMMARY OF THE INVENTION

The invention provides a correction method for time varying channel in a time-slotted mobile communication system. With the basic features of the block processing method being kept, this simple and effective method is adaptive to the channel response variation in a certain degree within a time-slot. With this correction method, application scope of a time-slotted CDMA system or similar block processing systems can be enlarged and performance thereof can be improved even with a larger frequency deviation and shift in the system or a higher moving speed of the terminal.

Accordingly, the invention provides the following technical scheme for achieving the foregoing.

According to the invention, a correction method for time varying channels in a time slot division mobile communication system includes the steps of:

A. performing channel estimation for a time slot or a burst received signal with a time invariant block processing method, and performing signal detection by using the channel estimation result to obtain a detection result; and, B. demodulating the detection result to recover the transmitted data;

wherein between step A and step B the method further includes the steps of,

A1. estimating the channel deviation by using part of the detection result close to the channel estimation code; and, A2. correcting the channel estimation with the estimated channel deviation.

In Step B, demodulation of the detection result is implemented with the corrected channel estimation.

In the first place, with the time invariant block processing method, the detection result is obtained. Part of the detection result is demodulated, and then with the demodulated result the channel deviation is estimated and corrected. In this way, the channel variations within the block is obtained. Then the detection result is demodulated again to recover the transmitted data.

The correction method for time varying channels presented by the invention is a simple method that can correct the channel varying which happens within a data block (field) to obtain the demodulated data. It is performed in an iterative mode along with selecting in each time of iteration a changing number of symbols that are close to the channel estimation code. With increasing iterative times, demodulated data gradually increase. When the set times of iteration is reached, all data are demodulated.

Thus, the characteristics of the invention include: performing channel estimation and signal detection with the time invariant block processing method; estimating the channel variation by using part of the symbols that are close to the channel estimation code; performing iterative corrections with the estimated deviations to obtain an increasingly accurate deviation estimation; and eventually recover the transmitted data.

The invention expands the application scope of the time slot CDMA system and other similar block processing systems, i.e. reducing the limiting conditions of the application thereof and improving the system performance when channels vary rapidly.

EMBODIMENTS OF THE INVENTION

The invention will be described in detail with reference to the accompanying drawings.

The method of the invention includes the following steps:

1) performing a channel estimation with the method that has existed for time invariant block processing, and performing signal detection with the channel estimation result to obtain detection results of all symbols in the data filed;

2) performing demodulation, hard decision, and re-modulation of the detection results of some symbols that are near the channel estimation code in the data field; estimating the channel deviation by comparing the re-modulated results with the detection results before the demodulation;

3) correcting the channel estimation result according to an approximate model by using the estimated channel deviation;

4) demodulating again the detection results of all symbols in the data filed obtained at Step 1) with the corrected channel estimation to recover the transmitted data.

Steps 2 and 3 above can be executed once, e.g. for a mobile terminal, or for a plurality of times (for example, twice), e.g. for a base station.

Figure 2:
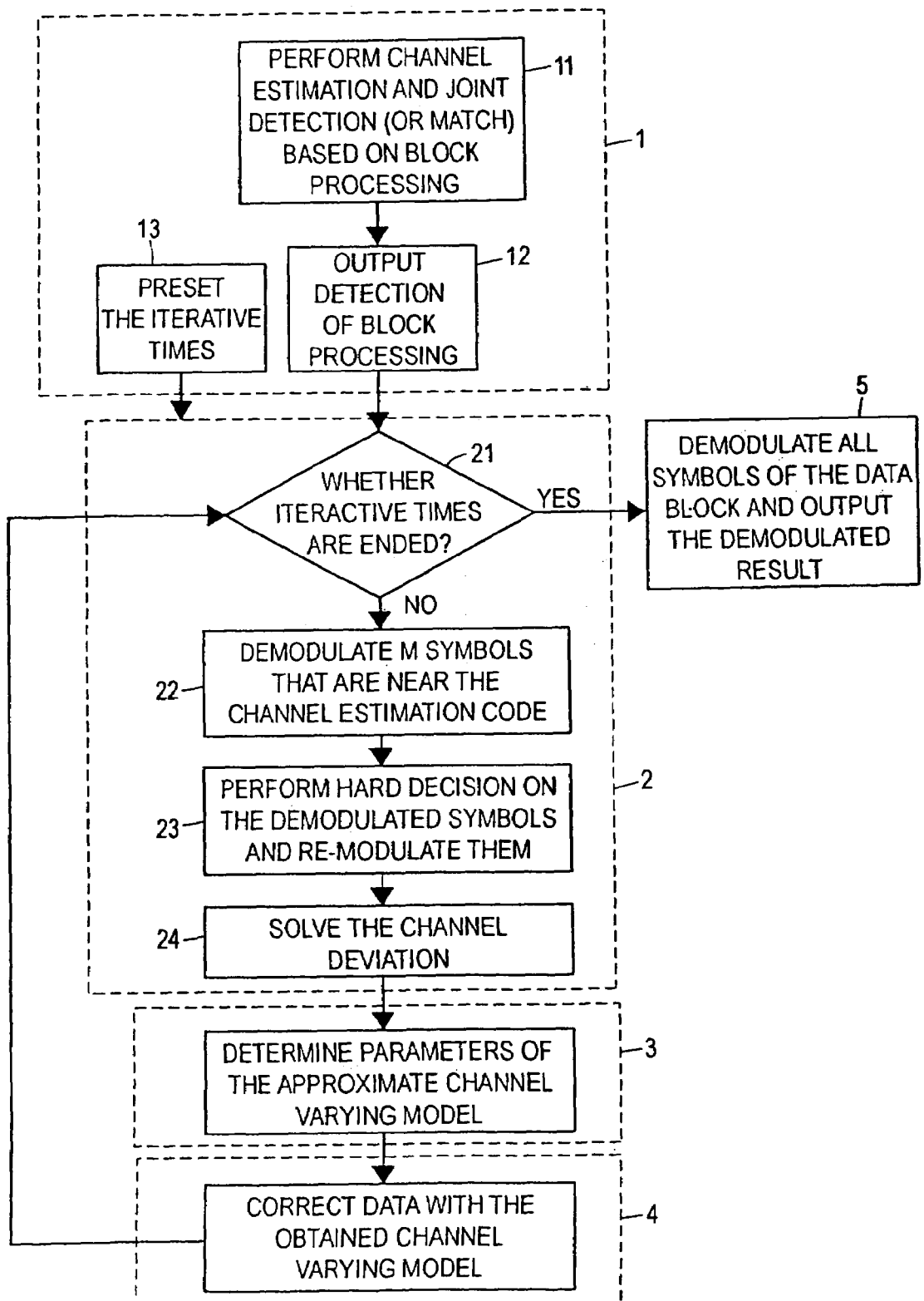
FIG. 2 shows the flowchart of an embodiment of the invention.

With reference to FIG. 2, the above steps are described hereinafter in detail by an embodiment.

The embodiment is carried out in a traffic time-slot of a TD-SCDMA system, i.e. there are two data fields in a TD-SCDMA traffic time-slot. For a time slot with one data field or a plurality of data fields, the implementation of channel correction is similar.

Step 1. First, perform channel estimation and signal detection (Step 11) with the processing method that the channel response is time invariant within a data block (field). The signal detection algorithm may be a joint detection algorithm, such as Zero Forcing-Block Linear Equalization (ZF-BLE), Minimum Mean Square Error-Block Linear Equalization (MMSE-BLE) and Interference Cancellation (IC) etc., or matched filtering detection (MF) or a RAKE receiver may be used. In this invention, the iterative correction operation takes the detection output of a block processing as the input signal (Step 12).

Figure 1:
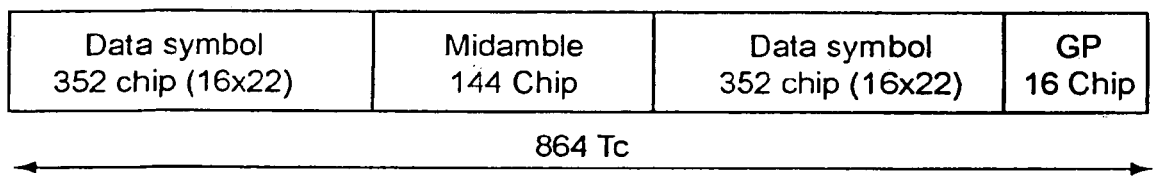
FIG. 1 shows a TD-SCDMA burst structure.

Usually, the iterative times and the number of symbols M that are taken near the channel estimation code for each iteration are determined by the overhead of the algorithm and the results of simulation and practical tests (Step 13). In this embodiment, the iteration is carried out twice, M of the first iteration is 8, and M of the second iteration is 16; M should be less than or equal to the total number of data symbols N in a code channel, i.e. $M \leq N$. If N in a TD-SCDMA system is 22 (refer to FIG. 1), the detection output of a block processing is the symbols after de-spread, which can be expressed in the following formulas:

$$d_1^{(k)} = (d_{1,1}^{(k)}, d_{1,2}^{(k)}, \cdots, d_{1,n}^{(k)}, \cdots, d_{1,N}^{(k)}) \quad (1\text{-}1)$$

$$d_2^{(k)} = (d_{2,1}^{(k)}, d_{2,2}^{(k)}, \cdots, d_{2,n}^{(k)}, \cdots, d_{2,N}^{(k)}) \quad (1\text{-}2)$$

Where k=1, . . . K representing the different code channels in a time-slot; n=1, . . . N representing the different symbols in a code channel, i.e. the total number of symbols in the code channel.

Formula (1-1) is the detection result of the first data field in the burst structure, and formula (1-2) is the detection result of the second data field in the burst structure.

Step 2. Perform demodulation and hard-decision for the detection result of some symbols (2M in number) that are near the channel estimation code (Step 22), then re-modulate the hard-decision results (Step 23), and then compare the re-modulated signal with the detection results of the 2M symbols before the demodulation to estimate the channel deviation (Step 24).

If M=8 symbols that are near the channel estimation code in each data field (block) are selected at the first iteration, then the detection output result of M symbols in each data field is as follows:

$$d_{1,M}^{\prime(k)} = (d_{1,N-M+1}^{\prime(k)}, \cdots, d_{1,m}^{\prime(k)}, \cdots, d_{1,N-1}^{\prime(k)}, d_{1,N}^{\prime(k)}) \quad (2\text{-}1)$$

$$d_{2,M}^{\prime(k)} = (d_{2,1}^{\prime(k)}, d_{2,2}^{\prime(k)}, \cdots, d_{2,m}^{\prime(k)}, \cdots, d_{2,M}^{\prime(k)}) \quad (2\text{-}2)$$

Compare these 2M symbols that have been demodulated, made hard-decision and re-modulated with the 2M symbols before the demodulation and the channel deviations are estimated as follows:

$$x_{1,i}^{(k)} = A_{1,i}^{(k)} \exp(j\varphi_{1,i}^{(k)}) = \frac{d_{1,i}^{(k)}}{d_{1,i}^{\prime(k)}}, \quad i = N-M+1, \cdots, N-1, N \quad (3\text{-}1)$$

$$x_{2,i}^{(k)} = A_{2,i}^{(k)} \exp(j\varphi_{2,i}^{(k)}) = \frac{d_{2,i}^{(k)}}{d_{2,i}^{\prime(k)}}, \quad i = 1, 2, \cdots, M \quad (3\text{-}2)$$

where $A_{1,i}^{(k)}$, $A_{2,i}^{(k)}$ are amplitude deviation (ratio); $\varphi_{1,i}^{(k)}$, $\varphi_{2,i}^{(k)}$ are phase deviation (difference).

For QPSK signals, only the phase deviation is solved, and the amplitude deviation may not be solved.

In implementation, the value of M is determined by the maximum varying of amplitude and phase allowed by the appropriate modulation mode: when the allowable varying scope of amplitude and phase is larger, a larger M is taken; and when the allowable varying scope of amplitude and phase is smaller, a smaller M is taken. For example, for a QPSK modulation, the minimum phase difference on the constellation is $\pi/2$; the maximum allowable phase estimation error when there is no noise interference is $\pi/4$; the phase error should be less if taking into account the noise interference tolerance of a received signal, such as $0.5 \times \pi/4$. For an 8-PSK modulation, the minimum phase difference on the constellation is $\pi/4$; the maximum allowable phase estimation error when there is no noise interference is $\pi/8$; the phase error should be less if taking into account the noise interference tolerance of a received signal, e.g. $0.5 \times \pi/8$.

An additional remark is that, for a multi-code-channel user, the deviation of different channels that belong to the same user, estimated at Step 24, can be averaged again to obtain a statistic mean value, which can be used to substitute the original estimated channel deviation.

The specific operation is in the following:

If a user has Kc code channels, the original estimated deviation (amplitude or phase) of each channel is $y'^k$, k=1, . . . Kc, then the statistic mean value is:

$$y^{(k)} = \frac{1}{Kc} \sum_{k=1}^{Kc} y'^{(k)} \quad (3\text{-}3)$$

For estimating the phase deviation of a channel, besides the method based on each symbol like step 24 (an absolute deviation), a difference method which is based on the phase difference between symbols (a relative deviation) also can be used to estimate the phase deviation of a channel. Namely, the phase difference between symbols (a relative deviation) also can be demodulated, performed hard decision on, re-modulated, and the re-modulated result is compared with the result before the demodulation to obtain the estimated phase deviation of a channel.

Step 3. Take an approximate model of channel varying of which parameters are determined by the 2M deviations given by the 2M symbols.

Usually, there are two types of model to be adopted: one is a linear approximate model, in which the channel varying in the whole time-slot is approximated with a linear with a fixed slope; the other is a ladder approximate model, in which the channel varying of two data fields are respectively approximated by being converted to fixed values of the center of each data field.

In this embodiment, the linear approximate model is adopted:

$$y_n^{(k)} = a^{(k)} t_n \quad (4\text{-}1)$$

where $t_n$ is the time position of a symbol;

$y_n^{(k)}$ is the channel deviation of the $k^{th}$ code channel corresponding to the time position. If $t_n=0$ is corresponding to the center of a time-slot, then $y_0^{(k)}=0$.

The parameter needed to be determined is the $\alpha^{(k)}$. With the channel deviations obtained at the last Step 24 and the corresponding positions of 2M symbols in the time-slot, an $\alpha^{(k)}$ can be obtained with the formula (4-1) corresponding to each symbol, represented by $\alpha_n^{(k)}$, and finally the $\alpha^{(k)}$ is $$a^{(k)} = \frac{1}{2M} \sum_n a_n^{(k)} \quad (4\text{-}2)$$

In this way, an approximate model of the channel response varying for each code channel is obtained.

Step 4. With the approximate model of the channel response varying obtained in the last step, the deviation value of each symbol in each code channel can be computed. The channel estimation is revised by the obtained deviation value and the detected data $d_1^{(k)}$ and $d_2^{(k)}$ are corrected in the formulas (1-1) and (1-2) with the revised channel estimation to obtain the corrected data $d_1^{''(k)}$ and $d_2^{''(k)}$, then return to Step 21.

Step 21. It is detected whether the iterative times have been reached, if not, further correction is needed; that is, make $d_1^{(k)} = d_1^{''(k)}$ and $d_2(k) = d_2^{''(k)}$, and go to Steps 22, 23, 24, Steps 3 and 4 to continue the correction; if the set times have been reached, go to Step 5 to demodulate all detection data that have been corrected and output them.

With the method of the invention, not only an accurate deviation of a channel but also the final demodulated data of a current time-slot can be obtained for a time-slot data or a burst data. The method corrects deviation by comparing the detection result before demodulating some symbols that is near a channel estimation code with the result thereof after having been demodulated, decided and re-modulated. The method also provides an approximate model for representing the amplitude and phase of a channel response.

The method can be used in the receiving processing of a base station and a mobile terminal.

The foregoing description of a preferred embodiment is for a person skilled in the art to employ the method of the invention. Various modifications to the embodiment will be appreciated to persons skilled in the art.

The invention claimed is:

1. A correction method for time varying channels in a time slot division mobile communication system including:
   A. performing channel estimation for a time-slot or burst signal received with a time invariant block processing method to obtain a channel estimation result and performing signal detection by using the channel estimation result to obtain a detection result;
   B. demodulating the detection result to recover transmitted data;
   wherein between Step A and Step B the method further comprises,
   A1. estimating a channel deviation by the detection result of some symbols that are near a channel estimation code; and
   A2. correcting the channel estimation with the estimated channel deviation; and demodulating the detection result in Step B by using the corrected channel estimation.

2. A correction method of claim 1, wherein performing the signal detection in Step A is implemented by a joint detection method including one of a Zero Forcing-Block Linear Equalization (ZF-BLE), a Minimum Mean Square Error-Block Linear Equalization (MMSE-BLE) or an Interference Cancellation (IC), or by a method of a matched filtering detection (MF) or a RAKE receiver.

3. A correction method of claim 1, comprising, before executing Step A1, the step of setting iterative times for repeating Steps A1 and A2; detecting before performing Step A1 whether the iterative times have been reached; if yes, going to Step B, otherwise repeating Steps A1 and A2, wherein, when Step A1 is executed, the number of symbols around the channel estimation code that are selected for the current iteration is greater than the number of symbols in the preceding iteration.

4. A correction method of claim 1, wherein the detection result of some symbols around the channel estimation code is the detection result of a selected number of data symbols, the selected number relates to maximum variations of phase and amplitude allowed by a modulation mode adopted by the mobile communication system while the larger the allowable maximum variation of amplitude and phase, the larger the selected number of data symbols.

5. A correction method of claim 1, wherein the step of estimating the channel deviation in Step A1 comprises demodulating, making hard decision on, and re-modulating the detection result of the symbols near the channel estimation code by symbols, and comparing the re-modulated result with the detection result before the demodulation to estimate the channel deviation including an amplitude deviation and a phase deviation.

6. A correction method of claim 1, wherein the step of estimating the channel deviation in Step A1 comprises demodulating, making hard decision on, and re-modulating the detection result of the symbols near the channel estimation code by the phase difference between symbols, and comparing the re-modulated result with the detection result before the demodulation to estimate a phase deviation of 9 channel.

7. A correction method of claim 1, wherein the step of estimating the channel deviation in Step A1 comprises, for a multi-code-channel user, averaging the estimated value of the channel deviation of each code channel of the user to obtain a statistical mean value, which is used as the estimated value of the channel deviation of different code channels of the same user.

8. A correction method of claim 1, wherein Step A2 of correcting the channel estimation with the estimated channel deviation comprises defining an approximate model of channel variation, determining parameters using the estimated channel deviation, computing a deviation value of each symbol in a data field with the approximate model of channel variation of which the parameters have been determined, and then correcting the channel estimation with the deviation value.

9. A correction method of claim 8, wherein the approximate model of channel variation is a linear approximate model that approximates channel varying in one time slot as a linear formation having a fixed slope.

10. A correction method of claim 8, wherein the approximate model of channel variation is a ladder approximate model that approximates the channel variation of two data fields which are respectively approximated by being converted to fixed values of the center of each data field.

* * * * *

UNITED STATES PATENT AND TRADEMARK OFFICE
CERTIFICATE OF CORRECTION

PATENT NO. : 7,272,166 B2 Page 1 of 1
APPLICATION NO. : 11/165957
DATED : September 18, 2007
INVENTOR(S) : Yingmin Wang It is certified that error appears in the above-identified patent and that said Letters Patent is hereby corrected as shown below:

On the Title Page:

At field (73), "Communication" should be -- Communications --.

At field (30), "02 1 60500" should be -- 02160500.9 --.

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO.         : 7,272,166 B2                                               Page 1 of 1
APPLICATION NO.    : 11/165957
DATED              : September 18, 2007
INVENTOR(S)        : Yingmin Wang It is certified that error appears in the above-identified patent and that said Letters Patent is hereby corrected as shown below:

In the Claims:

At Column 8, line 23 Claim 6, "of 9" should be -- of a --.

Signed and Sealed this

Twenty-first Day of October, 2008

JON W. DUDAS
*Director of the United States Patent and Trademark Office*